R. STAR.
FLEXIBLE CONNECTION.
APPLICATION FILED OCT. 26, 1918.

1,345,971.

Patented July 6, 1920.

WITNESSES
Arthur Frisch

INVENTOR
Richard Star
BY
ATTORNEYS

UNITED STATES PATENT OFFICE.

RICHARD STAR, OF BROOKLYN, NEW YORK.

FLEXIBLE CONNECTION.

1,345,971.    Specification of Letters Patent.    Patented July 6, 1920.

Application filed October 26, 1918. Serial No. 259,841.

*To all whom it may concern:*

Be it known that I, RICHARD STAR, a citizen of the United States, and a resident of the city of New York, borough of Brooklyn, in the county of Kings and State of New York, have invented a new and Improved Flexible Connection, of which the following is a full, clear, and exact description.

Among the principal objects which the present invention has in view are: to avoid breaking extensible members forming flexible connections between relatively rigid devices; to provide a tubular member freely extensible without danger of rupture or damage to the structure thereof; and to simplify and reduce the cost of manufacture of the connection.

*Drawings.*

*Description.*

Figure 1:
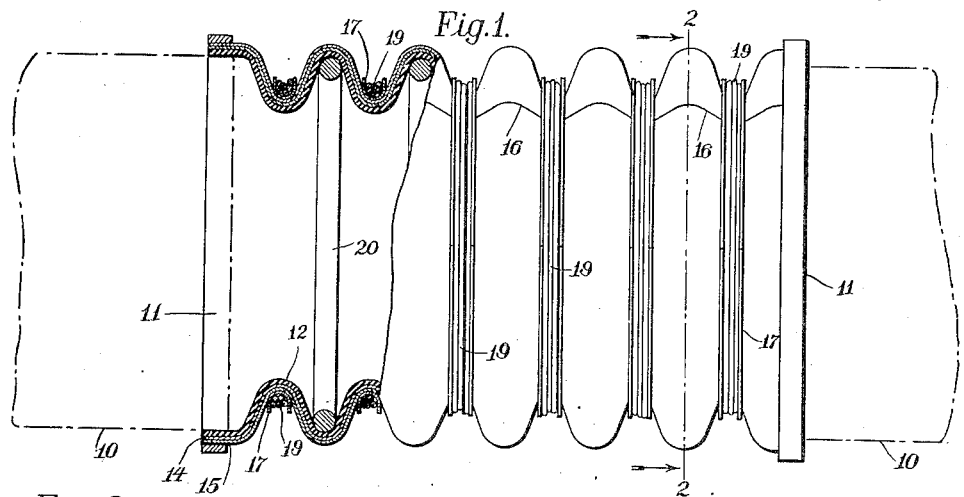
Figure 1 is a side view partly in section of a connection constructed and arranged in accordance with the present invention.

The application of the invention in service as shown in the drawings, is that where the connection is employed as a flexible union for hose pipe sections 10. To this end, the connection is provided at the opposite extremities with collar-like extensions 11, within which the ends of the hose pipe sections are secured. When so employed, the connection provides a bending joint, the parts whereof readily conform to the curvature of a bend without puncturing or diminishing the tubular passage with the concomitant objection of limiting the supply of water or other liquid passed therethrough. The connection is arranged to form a tubular pipe, the wall whereof is corrugated transverse the axis thereof. Corrugated pipes of the general formation have been made and have been used in substantially the same manner as suggested in the accompanying drawings.

These pipes have had a unit or integral construction. The result of such construction has been that difficulty has arisen in forming the corrugations, and, further, when forming, the corrugations have been weakened partly, on what may be termed the inwardly-extending corrugations. A further disadvantage which former constructions have labored under, has been that incidental to the lineal expansion and contraction to which the connection is subject, the so-called inturned convolutions have been pinched and drawn with the result that oftentimes the structure at these points has been ruptured.

In the present invention, the connection is formed from several layers or plies. The inner ply 12 is formed from a continuous indurated or rubber tube. The ply 12 is successively covered by ply sections 14 and 15. The ply sections 14 and 15 are supplemental each to the other. The corresponding sections when connected coöperate to form a continuous tube of an even diameter. The outer ply section 15 supplements by fitting snugly over the inner ply section 14 to form a continuous tube, the metal walls whereof are formed by the two thicknesses of metal.

Figure 2:
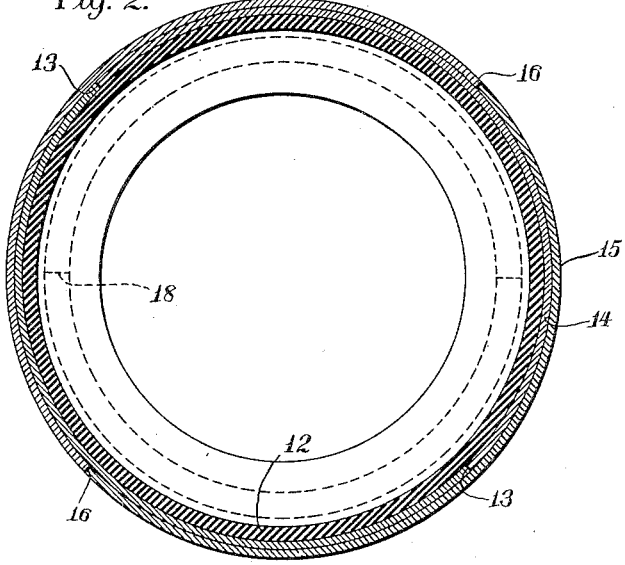
Fig. 2 is a cross section thereof, on an enlarged scale, the section being taken as on the line 2—2 in Fig. 1.
Figure 3:
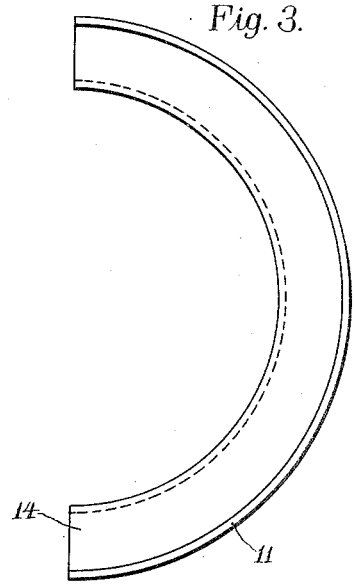
Fig. 3 is an end view of the half segment of one of the laminations forming the connection.
Figure 4:
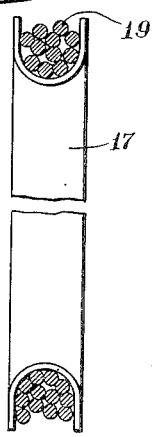
Fig. 4 is a sectional view of a binding ring segment used for reinforcing and safeguarding the inner folds of the connection.
Figure 5:
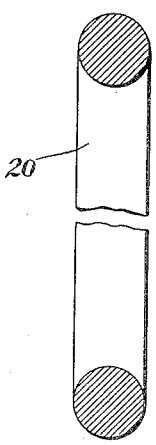
Fig. 5 is a cross section of a solid inside supporting ring.

The ply sections 14 and 15 are preferably formed by stamping the same in semi-circular form or cross section. This arrangement provides for the necessary draft of the male die used in stamping or pressing the said sections. The ply sections 14 and 15 are preferably constructed from thin resilient metal. When the ply sections are adjusted to form the connection, the joints 16 formed by the ply sections 15 are disposed in staggered relation to the joints 13 formed by the ply sections 14. As seen in Fig. 2 of the drawings, these joints are preferably disposed in diametrically opposite relation.

It is obvious that the overlaid metal sections could be readily disrupted or parted by internal pressures, if not mechanically restrained. To avoid this, there are provided a series of semi-circular outwardly opening groove sections 17. The joints 18 of the sections 17 are disposed out of line with either the joints 13 or 16. The sections 17 are drawn together by means of a continuous wire 19, which is wound a number of times around the said sections. The ends of the strand of wire are united in any approved manner. The wire thus disposed holds the various sections 17 and the ply sections 14 and 15 encompassed thereby, in established service relation, the resultant structure being a flexible accordion-like tube, the inner diameter of which is maintained constant and the convolutions of the structure are prevented from being injured by sharply bending the same.

The supporting ring 20 is made of solid metal and placed in some of the larger corrugations on the inside of the rubber lining to facilitate the assembling of the parts and to hold the parts in place from the inside.

From the foregoing, it will be seen that a flexible connection is constructed, which is rendered water- or liquid-proof by the rubber ply 12, while expansion is avoided by the metal ply sections 14 and 15, the latter being bent by the groove sections 17 and the wire 19 wrapped thereabout. It is obvious that when the connection is bent, the inwardly-extending convolutions are contracted upon the groove sections 17, which operate to prevent the collapse of the said convolutions.

Claims.

1. The combination with a flexible connection formed with a plurality of corrugated tubular lineal sections, of a plurality of continuous circular binding members for holding said sections in tubular arrangement, said binding members embodying a plurality of separable ring sections adapted to infold said tubular sections, and a suitable wrapping for said binding members.

2. The combination with a flexible connection having a plurality of corrugated tubular lineal sections, of a plurality of continuous circular binding members for holding said sections in tubular arrangement, said binding members embodying a plurality of outwardly opened grooved ring sections, and wrapping members for said ring sections, said wrapping members adapted to fill the bottoms of said ring sections.

3. A flexible connection comprising a plurality of corrugated tubular lineal sections adapted to contract and expand lengthwise, means filling the bottoms of the inwardly extending corrugations of the tubular sections for preventing the pinching together of said corrugations, and a plurality of continuous circular binding members for holding said tubular sections in tubular arrangement.

4. The combination with a connection having lineally corrugated walls adapted to contract and expand longitudinally, of means filling the bottoms of the inwardly extending corrugations for preventing the pinching together of the side walls thereof, said means embodying a wrapping restraining member, said means filling the external grooves formed by the internal corrugations for preventing the pinching together of the sides of the corrugations.

5. The combination with a connection having lineally corrugated walls adapted to contract and expand longitudinally, of means for filling the bottoms of the inwardly extending corrugations for preventing the pinching together of the side walls thereof, and a plurality of ring-like members preventing the collapse of the corrugations extending outwardly from the side walls.

RICHARD STAR.